Patented Apr. 15, 1952

2,592,973

UNITED STATES PATENT OFFICE 2,592,973

PURIFICATION OF MINERALS

Reginald Sturgeon and Eric Seddon, London, England, assignors to The United Glass Bottle Manufacturers Limited, London, England, a British company No Drawing. Application October 22, 1949, Serial No. 123,096. In Great Britain October 25, 1948

8 Claims. (Cl. 23—182)

This invention relates to the purification of minerals especially siliceous materials, for example silica sands, quartzite, quartz rock, gravel, sandstone, but also other minerals such as fluorspar, felspar and alumina.

The reduction of the content of certain impurities especially iron and chromium compounds is important for certain purposes.

For example, these impurities in silica sands used for the manufacture of colourless glass, impart undesirable colour to the glass. This discoloration can be partially eliminated or masked by the addition of various materials, for instance, arsenious oxide or antimony oxide and selenium metal with cobalt oxide, but this is less effective with increasing content of the impurity.

For good quality, colourless glass containers, the sands should contain no more iron than is equivalent to 0.03% $Fe_2O_3$, and no more chromium than corresponds to 0.0005% $Cr_2O_3$. For the very best quality table- and stem-ware, suitable sands should contain iron no higher than is equivalent to 0.010 to 0.015% $Fe_2O_3$, with a chromium content at or below the amount corresponding to 0.0002% $Cr_2O_3$.

The present invention is mainly concerned with the reduction of the iron content of the mineral.

Of the silica sands, crushed rocks, etc., at present available, only a relatively small proportion meet the above specifications for sands for manufacturing colourless glass containers, or colourless high quality table- and stem-ware.

Among the processes proposed previously for purifying silica sands and the like, the following may be mentioned:

(i) Treatment with strong acids, without or with heat, at atmospheric or at elevated pressure, to remove iron oxide.

(ii) Roasting the sand with sodium chloride and afterwards leaching with water.

(iii) Treating the sand by passing it downwards through perforated plates in a tower, in counter-flow to ammonium chloride and dry air at about 500° C., the reaction gases being passed into water. Iron is removed as the volatile ferric chloride.

(iv) The sand may be washed with an aqueous solution of sodium carbonate, or sodium sulphide, or alternatively with such detergents as sodium hexametaphosphate, tetra sodium pyrophosphate, etc., in aqueous solution, without or with sodium carbonate.

(v) Washed silica sand can be treated with an aqueous solution containing 15% sulphuric acid and 5% ferrous sulphate at a temperature between 80° and 100° C., or (vi) Alternatively the sand may be treated with an aqueous solution containing a small quantity of acid oxalate or quadroxalate, and a small amount of crystalline ferrous sulphate (not exceeding about one half the quantity of acid oxalate or quadroxalate). The treatment is effected with a warm solution considerably below the boiling point, and preferably at a temperature between 80° F. and 120° F.

(vii) It has been proposed to treat sands, etc., with dilute solutions of titanous sulphate or chloride, and a fluorine compound, such as, for example, hydrofluoric acid, sodium fluoride or sodium silicofluoride.

Of the several processes at present available of which some are outlined above, some are scarcely applicable on the commercial scale, some are costly and some can only be applied successfully to isolated sands. In certain of the processes enumerated and which can be operated commercially, it is necessary to use temperatures well above normal atmospheric temperatures, or alternatively to use very corrosive chemicals; both these result in increased cost, and in greater difficulty of handling.

We have now ascertained that highly satisfactory results in the diminution of undesirable iron impurities, can be obtained by treating the mineral with aqueous solutions containing titanous sulphate and/or chloride and sodium sulfate and/or chloride. Thus a solution of titanous sulphate and sodium sulphate or a solution of titanous chloride and sodium chloride may be used. Alternatively, the sulphate of one of these metals and the chloride of the other may be used. The effect of these mixtures is much greater than the mere additive effects of the salts separately, as is evidenced by the example which we include in a later section. When taken into solution, the mixed salts appear to form double salts, such as titanous sodium sulphate or chloride; these, in solution, give a greater reducing power and attack the iron oxide impurities more vigorously than either of the salts separately and, as already mentioned, more vigorously than would appear to result from a mere additive effect of the separate salts. The double salts formed, in solution, appear to be appreciably more stable than the single salts, to the oxidising effect of the atmosphere, a particularly valuable property when solutions of relatively low concentrations are used. The following typical equations represent the chemical action occurring:

1st stage:

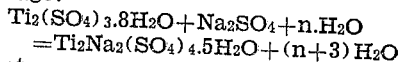

2nd stage:

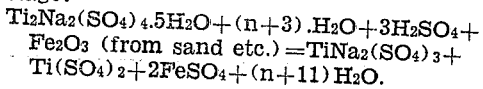

It does not appear necessary to have the individual salts of the mixed solution in any exact ratio of concentrations. The strength or concentration of each salt in the mixed solution needs to be related to the amount of iron oxide impurity which has to be removed; some slight additional allowance must be made for such oxidising effect of the atmosphere as prevails under the conditions of the particular plant employed for the chemical treatment. It is not advantageous to use excessively high concentrations of the chemicals cited. Solution strengths may range conveniently from one-twentieth of one per cent or less up to five per cent.

The solutions described possess certain advantages in commercial processing. Besides their strong reducing power and comparative stability to the oxidising effect of the atmosphere, they avoid the formation of precipitates such as occur when oxalic acid is used, and they favour the recovery or re-generation of the chemicals. Economic advantages may result from the operation of a recovery or re-generation process.

The following tests show the advantages obtained by the invention:

TESTS OF A BRITISH YELLOW SAND

|  | Per cent $Fe_2O_3$ |
|---|---|
| Raw sand | 0.090 |
| Sand after vigorous water-washing | 0.071 |
| Sand after vigorous water-washing plus heavy mineral removal | 0.054 |

Using solutions of 1% strength

| Aqueous solution containing | Per cent $Fe_2O_3$ removed from sand | Final per cent $Fe_2O_3$ content of sand |
|---|---|---|
| 1% NaCl | 0.006 | 0.048 |
| 1% $TiCl_3$ | 0.015 | 0.039 |
| 1% $TiCl_3$ + 1% NaCl | 0.034 | 0.020 |
| 1% $Na_2SO_4$ | 0.003 | 0.051 |
| 1% $TiCl_3$ + 1% $Na_2SO_4$ | 0.033 | 0.021 |

Using solutions of ¼% strength

| Aqueous solutions containing | Per cent $Fe_2O_3$ removed from sand | Final per cent $Fe_2O_3$ content of sand |
|---|---|---|
| (i) Titanous chloride series: |  |  |
| ¼% NaCl | 0.004 | 0.050 |
| ¼% $TiCl_3$ | 0.012 | 0.042 |
| ¼% $TiCl_3$ + ¼% NaCl | 0.021 | 0.033 |
| ¼% $TiCl_3$ + ¼% $Na_2SO_4$ | 0.019 | 0.035 |
| (ii) Titanous sulphate series: |  |  |
| ¼% $Na_2SO_4$ | 0.002 | 0.052 |
| ¼% $Ti_2(SO_4)_3$ | 0.015 | 0.039 |
| ¼% $Ti_2(SO_4)_3$ + ¼% $Na_2SO_4$ | 0.029 | 0.025 |

As the scale of the processing is increased, it is possible to diminish the concentration of the chemical solution from the 1% and ¼% strengths shown in the above examples; dilutions to one-twentieth of one per cent or less, become practicable.

Various additional substances may be incorporated in the solution, such as other sulphates, chlorides, or other salts, or one of the following, viz. formic acid, tartaric acid, oxalic acid, sodium acid oxalate, hydrochloric acid, sulphuric acid, acetic acid, ferrous sulphate and hydrazine sulphate.

The solution may, with advantage, contain chemically-suitable wetting agents or detergents whereby intimate contact between the chemicals and the surface of the individual sand grains can be assured. In this way the ferruginous coating or stain can be attacked even more rapidly and completely.

The treatment is normally carried out at atmospheric temperatures, the process being considerably simplified thereby; the risk of the undesirable oxidation by the atmosphere is, in consequence, minimized. If, however, the properties of certain sands make it necessary, the chemical action on the impurities can proceed at higher temperatures, up to, but not reaching 100° C.

To obtain the most effective chemical action on the coating of impurity, intimate contact between sand grains and the chemical solution must be maintained by thorough tumbling, mixing, stirring or other agitation. The vessels or plant for reaction should provide this efficient mixing and may comprise tubs, rotating vessels (vertical, inclined or horizontal), or attrition scrubbers and/or centrifugal pumps. To minimize oxidation of the chemicals, residual air should be excluded and the entry of any additional air during the chemical treatment of the sand should be prevented. A blanket of nitrogen or some other inert gas, or some shielding film of oil, etc., can be used to exclude air and avoid or minimize such atmospheric oxidation.

Reaction vessels should be designed, and minimum temperatures should normally be used, to meet these requirements of minimum oxidation.

All vessels, pumps, connecting lines, etc., should be in a material or materials resistant to the action of the chemical solutions used, and/or should be suitably coated with rubber, etc. They should be incapable of contributing any undesirable impurities, such as iron or chromium to the sand. We have ascertained that among other materials, certain stainless steels possess suitable properties.

The precise time of contact between the sand grains and the solution of titanous chloride or titanous sulphate and sodium chloride or sodium sulphate (or the like) must be chosen to suit the particular sand that is being processed; this time will also depend on the relative proportions of sand and chemical solution, on the strength of the latter, on the temperature at which the reaction proceeds, on the vigour with which scrubbing or attrition is carried out, and on the degree of success obtained in excluding the oxidising effect of the atmosphere.

The time of contact does not, under normal conditions, exceed a few minutes.

We have ascertained that the titanium salts can be recovered from the titanic condition and regenerated to the original titanous state by such well-known processes as a zinc-mercury amalgam ("Jones") reductor tower, or by using a cadmium reductor tower with the cadmium present as fine particles, or alternatively, by using an electrolytic method such as is employed commercially in preparing titanous salts.

In our process for treating sands, and the like, by chemical means, we propose to make full use of these, or other, recovery or regeneration systems, choosing the method of recovery to suit the chemical combination adopted for treating the sand. With mixed solutions such as titanous sulphate-sodium sulphate, or titanous chloride-sodium chloride, etc., either reductor towers or the electrolytic method can be employed. We have ascertained that when using the reductor tower, the titanic solution must have present sufficient acidity, of approximately 3% by volume sulphuric acid, if the reduction is to be speedy and efficient; a filter system is also essential. When using the electrolytic recovery system, an appropriate acidity is essential if efficient operation is to be realized.

When the silica sand or the like has passed through the chemical process which forms the subject matter of the present invention, it is submitted, in turn, to de-solutionizing, to water-washing, and to de-watering processes.

At the de-solutionizing stage, any excess solution (which may contain products in solution of the interaction with the ferruginous or chromium-bearing strains or coatings on the sand grains) should be completely separated from the sand grains; the oxidising effects of air must be minimized at this stage as in earlier parts of the chemical process.

At the second, water-washing stage, any solid products of interaction are effectively washed away from the "cleaned" sand grains, and the washing process continues until only the "cleaned" sand grains and clean water remain in association.

At the third (de-watering) stage, the wet, "cleaned" sand grains are freed from the associated clear water, leaving behind practically dry, "cleaned" sand grains.

We have ascertained that for the first and third of these stages, the de-solutionizing or the de-watering can successfully be carried out by centrifugal action. By this means, up to 98% of the chemical solution can be recovered, and the water content of the sand can be reduced below 1% if so desired. The centrifuge, which may be of the continuous or non-continuous type, is built of, or coated with, a material or materials which are unaffected by the chemicals employed, and which yield no measurable quantity of deleterious impurities, such as iron or chromium.

The plant used at the second stage, for water-washing, must successfully separate the two phases, i. e. the "cleaned" sand grains, and the iron- or chromium-bearing impurities; the plant must ensure that each sand grain is effectively surrounded and washed by water. A counter-flow washer or one of the well-known types of classifiers, would fulfill this requirement. In no circumstances must the impurities be allowed to re-join the cleaned sand grains; if de-watering devices are employed to reduce the moisture content of the purified sand, prior to feeding into trucks, lorries, barges, etc., or on to conveyors or stock piles, the "cleaned" sand must not be allowed to act as a filter for contaminated wash water.

Not only is it desirable to treat the mineral with the aforesaid solution or solutions, but it is also desirable to carry out the removal of impurities by steps in a certain sequence. The mineral prior to treatment with the solution according to the present invention should be water-washed, and subjected to a heavy mineral separation, for example, by means of a mining separation table, jig-washer, etc., or by froth flotation.

We claim:

1. A process for reducing iron impurities in minerals which consists in treating the minerals with an aqueous solution which is free from fluorine ions and oxalic acid but in which the dissolved constituents consist essentially of metallic salts one of which is selected from the group consisting of titanous sulphate and titanous chloride, and the other is selected from the group consisting of sodium sulphate and sodium chloride, and recovering the purified mineral product.

2. A process as claimed in claim 1, wherein the solution contains from one twentieth of one per cent up to 5% of each salt.

3. A process for reducing iron impurities in minerals, which consists in treating the minerals with an aqueous solution which is free from fluorine ions and oxalic acid but in which the dissolved constituents consist essentially of at least two metallic salts one of which is selected from the group consisting of titanous sulphate and titanous chloride and the other of which is selected from the group consisting of sodium sulphate and sodium chloride, said solution also including at least one acid selected from the group consisting of formic acid, tartaric acid, hydrochloric acid, sulphuric acid and acetic acid, and recovering the purified product.

4. A process for reducing iron impurities in minerals, which consists in treating the minerals with an aqueous solution which is free from fluorine ions and oxalic acid but in which the dissolved constituents consist essentially of at least two metallic salts one of which is selected from the group consisting of titanous sulphate and titanous chloride and the other of which is selected from the group consisting of sodium sulphate and sodium chloride, said solution also including a wetting agent, and recovering the purified product.

5. A process for reducing iron impurities in minerals, which consists in treating the minerals with an aqueous solution which is free from fluorine ions and oxalic acid but in which the dissolved constituents consist essentially of at least two metallic salts one of which is selected from the group consisting of titanous sulphate and titanous chloride and the other of which is selected from the group consisting of sodium sulphate and sodium chloride, and maintaining the reaction temperature below 100° C., and recovering the purified product.

6. A process for reducing iron impurities in minerals, which consists in treating the minerals in a non-oxidising atmosphere with an aqueous solution which is free from fluorine ions and oxalic acid but in which the dissolved constituents consist essentially of at least two metallic salts one of which is selected from the group consisting of titanous sulphate and titanous chloride and the other of which is selected from the group consisting of sodium sulphate and sodium chloride, and recovering the purified product.

7. A process for reducing iron impurities in minerals, which consists in treating mineral grains in an aqueous solution which is free from fluorine ions and oxalic acid but in which the dissolved constituents consist essentially of at least two metallic salts one of which is selected from the group consisting of titanous sulphate and titanous chloride and the other of which is selected from the group consisting of sodium sulphate and sodium chloride, and maintaining said grains and solution in agitation during said treatment, and recovering the purified product.

8. In a process for reducing iron impurities in minerals, the steps of subjecting mineral grains to the action of an aqueous solution which is free from fluorine ions and oxalic acid but in which the dissolved constituents consist essentially of metallic salts of which one is selected from the group consisting of titanous sulphate and titanous chloride and the other of which is selected from the group consisting of sodium sulphate and sodium chloride, separating the cleaned grains from the solution to recover at least substantially the entire solution, then washing the grains in water, and thereafter centrifuging said grains to remove at least substantially the entire water content therefrom, and recovering the purified product.

REGINALD STURGEON.
ERIC SEDDON.

REFERENCES CITED

The following references are of record in the file of this patent:

UNITED STATES PATENTS

| Number | Name | Date |
| --- | --- | --- |
| 2,381,843 | Sherlock | Aug. 7, 1945 |